United States Patent [19]
Geisthoff

[11] 3,961,677
[45] June 8, 1976

[54] DEVICE FOR CONNECTING A POWER TRANSMISSION SHAFT OF AN AGRICULTURAL IMPLEMENT, MACHINE OR THE LIKE TO A TRACTOR POWER TAKE-OFF SHAFT

[75] Inventor: Hubert Geisthoff, Lohmar, Donrath, Germany

[73] Assignee: Jean Walterscheid GmbH, Lohmar, Rhineland, Germany

[22] Filed: Sept. 9, 1974

[21] Appl. No.: 504,113

Related U.S. Application Data

[62] Division of Ser. No. 401,863, Sept. 28, 1973, Pat. No. 3,847,415.

[30] Foreign Application Priority Data

Sept. 29, 1973  Germany............................ 2247903

[52] U.S. Cl. .............................. 180/14 B; 280/477;
280/479 A; 280/508; 180/53 D
[51] Int. Cl.² ............................................ B60D 1/00
[58] Field of Search ............... 180/14 R, 14 B, 53 R,
180/53 D; 280/420, 478 R, 478 A, 478 B,
479 R, 479 A, 490 R, 490 A, 508, 477

[56] References Cited
UNITED STATES PATENTS

| 2,269,023 | 1/1942 | Hendricks | 280/477 |
| 2,636,568 | 4/1953 | Rutishauser | 180/53 D |
| 2,793,880 | 5/1957 | Oehler et al. | 280/477 |
| 2,822,739 | 2/1958 | Altgelt | 280/477 |
| 3,074,501 | 1/1963 | Lane | 180/14 R |
| 3,171,673 | 3/1965 | Webber | 280/477 |
| 3,285,625 | 11/1966 | Krueger | 280/479 R |
| 3,292,949 | 12/1966 | Restall | 280/479 R |
| 3,306,630 | 2/1967 | Weiste | 280/479 R |
| 3,379,457 | 4/1968 | Restall et al. | 280/479 R |
| 3,489,431 | 1/1970 | McKeon et al. | 280/478 R |
| 3,716,253 | 2/1973 | Gniffke et al. | 280/446 R |

Primary Examiner—M. H. Wood, Jr.
Assistant Examiner—Jack D. Rubenstein
Attorney, Agent, or Firm—Edmund M. Jaskiewicz

[57] ABSTRACT

A catch bar is pivotally mounted on the rear end of a tractor and an alignment roller is mounted on the catch bar. A coupling plate is mounted on the implement to be connected. An aligning hook is secured on the coupling plate and has an opening engageable with the catch bar alignment roller so as to align vertically and horizontally the plate and its transmission shaft with the power take-off shaft on the tractor. The tractor power take-off shaft and the coupling plate power transmission shaft are provided with mutually engageable means for coupling the shafts in the vicinity of the coupling plate.

6 Claims, 11 Drawing Figures

DEVICE FOR CONNECTING A POWER TRANSMISSION SHAFT OF AN AGRICULTURAL IMPLEMENT, MACHINE OR THE LIKE TO A TRACTOR POWER TAKE-OFF SHAFT

RELATED APPLICATIONS

The present application is a division of co-pending application Ser. No. 401,863, filed Sept. 28, 1973, now U.S. Pat. No. 3,847,415 by the same-named applicant.

It is known to operatively connect an agricultural machine or the like to a tractor by means of the so-called three point hitch device. The several guide bars and rods in this hitch device impair accessibility to the space between the tractor and the traction bar or hitch pole of the agricultural machine or trailer. The presence of the guide bars also renders it difficult to engage the drive transmission shaft on the machine with the power takeoff shaft on the tractor. Further, the presence of detachable or loose guide bars in a rather limited space presents constant dangers to any personnel in the immediate vicinity of the hitch device and the risk of accident is always present.

It has been proposed to provide a three point hitch on a tractor which essentially comprises a triangular frame which cooperates with another frame structure mounted on the implement or machine to be connected to the tractor. This type of coupling has the disadvantage that the triangular frame interferes when it is desired to connect a trailer or the like to the tractor by means of a traction bar, jaw or the like.

It has also been proposed to connect trailer machines or implements, which are relatively heavy, to the lower guide bars of the lifting device on the tractor such that one end of the machine is attached to the guide bar and the other end is supported by wheels. However, in this structure also it is difficult to achieve an operative joint between the drive transmission shaft of the machine and the power take-off shaft of the tractor unless a transmission shaft is provided which has universal joints therein and is a component of the three point hitch device. These connection difficulties generally arise from the lateral and upward movement necessary for proper alignment of the drive shafts in order that they may be coupled. It is necessary for the operator to make a manual connection between the transmission shaft which is a part of the machine or implement and the drive shaft of the tractor. Further, this manual connection must be made under confined and restricted conditions. In all such arrangements it is further necessary to perform manually an additional operation to lock the connection. As far as known, no automatic coupling devices are available for traction jaw operation of agricultural machinery. Where hydraulic, electric and pneumatic connections must be made between the tractor and the machine such connections must be performed manually.

It is therefore the principal object of the present invention to provide a novel and improved device for automatically connecting a power transmission shaft of a machine, implement or the like to a tractor vehicle power take-off shaft while connecting the machine to the tractor.

It is a further object of the present invention to provide such a connecting device wherein the connection operation can be achieved safely and with a minimum of danger by not requiring any personnel to enter the space between the tractor and the machine.

It is an additional object of the present invention to provide such an automatic connection device which can be used in conjunction with or in combination with existing hitch devices particularly on agricultural machinery.

According to one aspect of the present invention the connection device may comprise a catch bar pivotally mounted on the tractor vehicle, or on the machine, and an alignment roller is journalled on the catch bar. The other of the machine or the tractor vehicle is provided with a coupling plate upon which is mounted at least one alignment hook whose opening is adapted to engage with the alignment roller on the catch bar so as to align vertically and horizontally the plate and its transmission shaft with the power take-off shaft on the tractor. The tractor power take-off shaft and the coupling plate power transmission shaft are provided with mutually engageable means for coupling the shafts in the vicinity of the coupling plate. There is also provided at least one locking hook, stop bolt or locking means to connect the coupling plate with respect to the tractor vehicle upon completion of the coupling operation.

An advantage of the present invention is that both or one of the tractor and the machine can be provided with conventional or known connecting or coupling units. such coupling units may comprise an arrangement for complete suspension of an agricultural implement as well as for the connection of implements provided with power transmission shafts. Further, the present invention also permits the use of flange connections of accessories such as winches, pumps or the like. The hitch device may also be used with the conventional three point hitch which provides two lower and one upper guide bars on the tractor. With the three point hitch, the coupling plate of the present invention can participate in the coupling of a machine including the alignment and connection of the transmission drive shaft.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
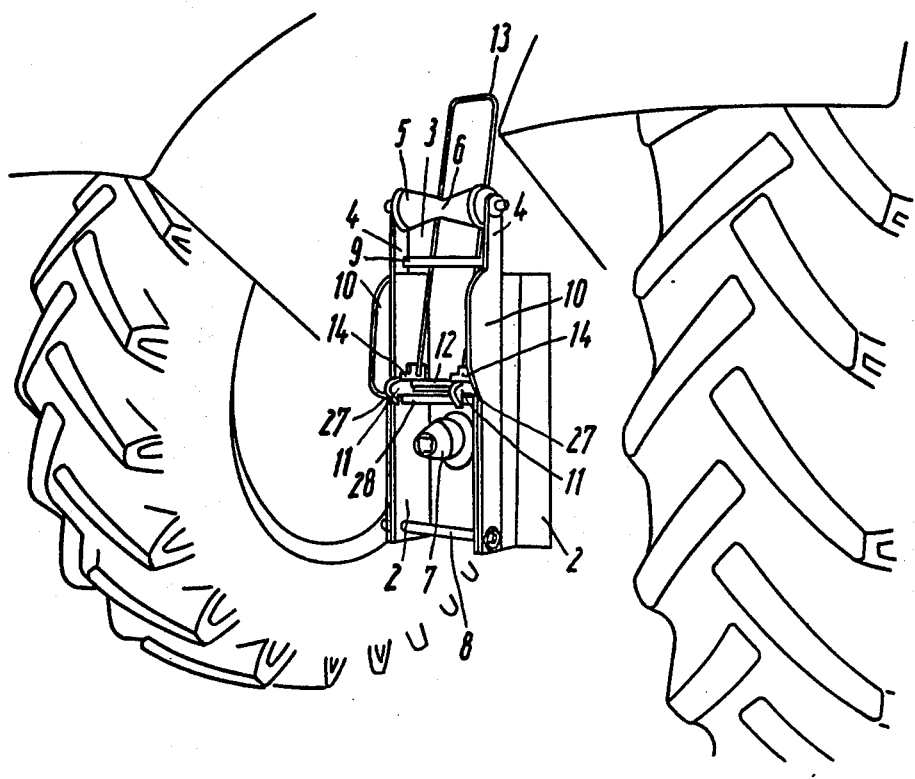
FIG. 1 is a perspective view of the rear of a tractor, indicated diagrammatically only, provided with the connecting device according to the present invention.
Figure 2:
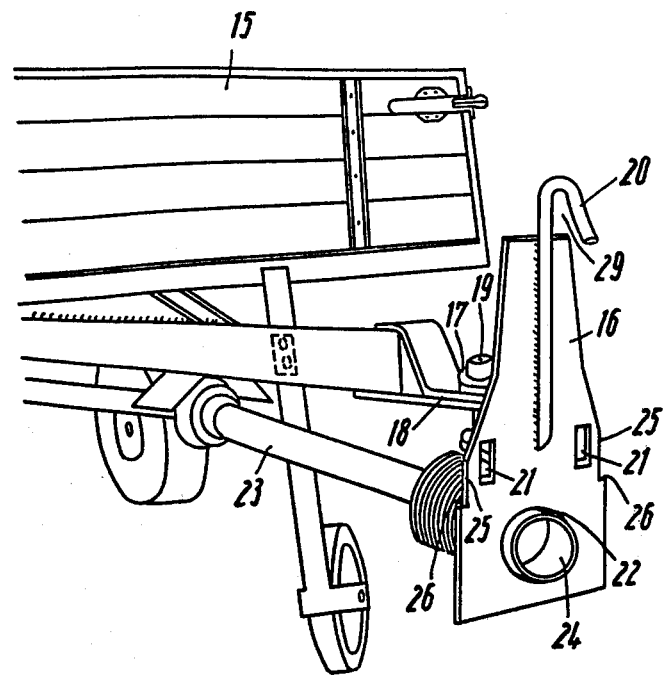
FIG. 2 is a perspective view of the front end of a machine provided with a coupling plate according to the present invention and also provided with a power transmission shaft.

As may be seen in FIG. 1, a tractor 1 is provided with two spaced vertically extending mutually parallel perforated fixing bars 2. In the lower region of these fixing bars 2 the lower end of a catch bar 3, which consists of two mutually parallel links 4, is mounted for pivotal movement by means of a shaft or bolt 8 defining an axis. The links 4 carry at their upper end an alignment roller situated therebetween and taking the form of a twincone roller 5 wherein the smallest diameters of the cones are directed toward each other so that the roller tapers in its central region 6. The two links 4 are mutually connected by means of a bracing strut 9. The links 4 further comprise side or guide plates 10 which provide lateral guidance for a coupling plate. On the tractor 1 or on the perforated bars 2 there are further arranged two locking hooks 11 mutually connected by an intermediate or spacer element 12 and having a common actuating bracket 13 which functions also to actuate the locking elements 14 which are associated with the locking hooks 11. The tractor 1 comprises a power take-off shaft having a quick-coupling or joint member indicated at 7.

The links 4 are additionally interconnected by means of a bracing strut 28. The hook mouth or jaw of the locking hooks 11 extends over this strut and secures the catch bar 3 in rest position.

A working machine 15 e.g., a manure spreader, which is to be attached or coupled to the tractor 1 carries a coupling plate 16 provided with a traction jaw 17 engaged by means of a bolt 19 in a traction loop 18. The coupling plate 16 has welded thereon alignment hook 20. The coupling plate 16 is further provided with perforations 21 corresponding positionally with the locking hooks 11. The coupling plate 16 also has an opening 22 through which passes a joint member 24 of a power transmission shaft 23. The joint member 24 is secured relative to the coupling plate 16 in a bearing (concealed by the shield plate). The coupling plate 16 has two guide faces 25 for horizontal alignment of the coupling plate 16 which co-operate with the side plates 10 of the catch arm 3. Two stepped abutment faces 26 serve to assure vertical locking of the coupling plate 16 and cooperate with underfaces 27 of the side plates 10.

Figure 3:
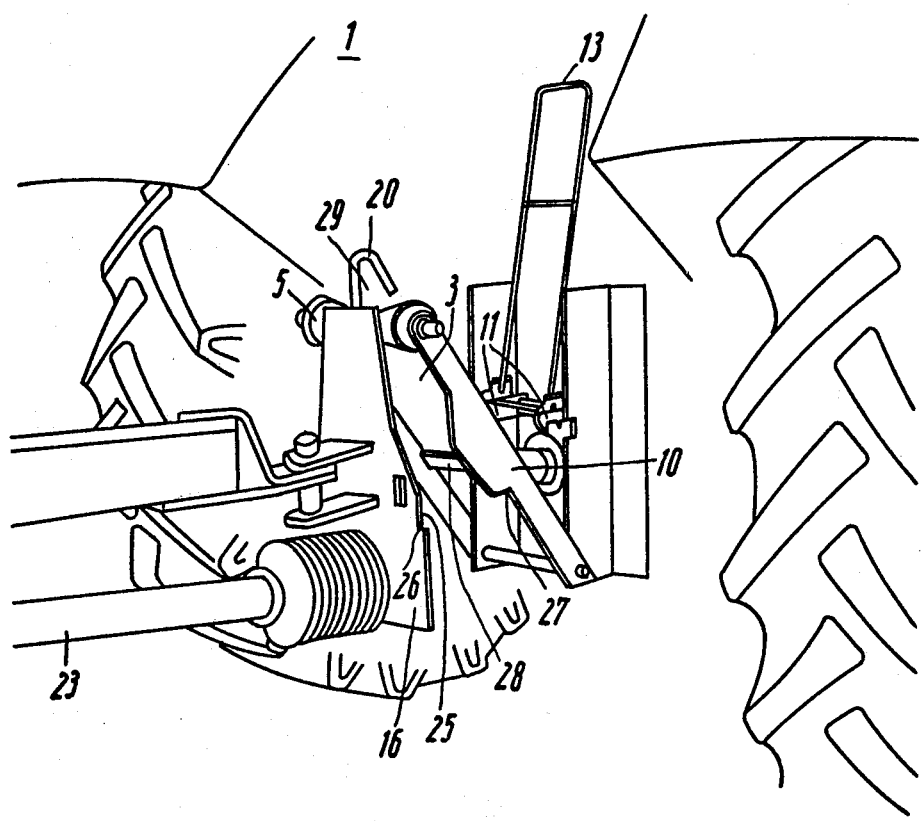
FIG. 3 is a perspective view looking toward the rear of the tractor at the beginning of the connecting operation between the tractor and the machine.
Figure 4:
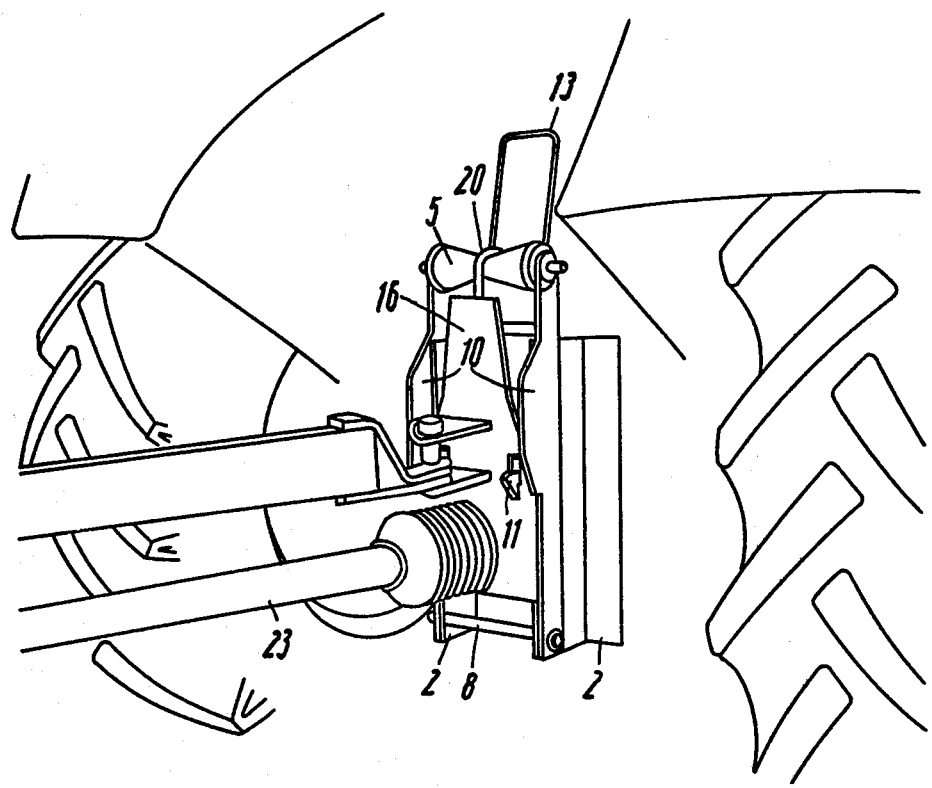
FIG. 4 is a view similar to that of FIG. 3 and showing the components at the completion of the connection operation.

FIG. 3 shows the coupling operation commencing by lifting the locking hooks 11 by means of the actuating bracket 13. The hook jaw of the hooks 11 will thus be moved out of range of the strut 28 so that the catch bar 3 may be pivoted downwardly. The vehicle 1 and with it the catch bar 3 are now moved in the direction towards the coupling plate 16 which is associated with the working machine (not shown) to be attached. The alignment roller 5 engages with the coupling plate 16 and on further approach of the vehicle the roller 5 comes into the region of the opening 29 of the alignment hook 20. In view of the inwardly directed taper of the alignment roller 5 the hook 20 will line up towards this tapered roller portion 6. Further approach of the vehicle 1 causes the plate 16 to be lifted. The side plates 10 will engage with the guide faces 25 on the plate 16 to align the latter in the lateral direction. The locking hooks 11 abut against the coupling plate 16 in the region of the perforations 21, where they are lifted, slide through the perforations 21 and subsequently drop into operative engagement as in FIG. 4. Furthermore, the lower edge 27 of the side plates 10 engages with the stepped abutment faces 26 on the plate 16 and, in conjunction with the hook 20, maintains the plate 16 firmly in the vertical plane. The joint or coupling members of transmission shaft 23 and driving shaft 7 also line up to face one another.

The strut 28 prevents the catch bar from dropping into operative or catch position in the event that no working machine or trailer is attached to the tractor or like vehicle since the hook jaws of the locking hooks extend over said strut. Thus, if the device is not in operative position the locking hooks also serve to secure the catch bar in inoperative or rest position.

According to another feature of this invention the catch bar and the retaining or holder means with their locking elements are fitted on two vertically extending, relatively spaced apart and parallel receiving or supporting bars. These may, as the catch bar itself, provide an abutment or engagement face for the shield plate.

In order to facilitate the coupling operation, particularly in the case of drawn (rearwardly attached) working machines, a further characteristic of this invention provides that a lever is connected to the bearing axis of the catch arm, which lever is connected by means of a further lever, a chain or a cable to a power drive unit, in particular to a lifting device associated with the vehicle or tractor.

Figure 5:
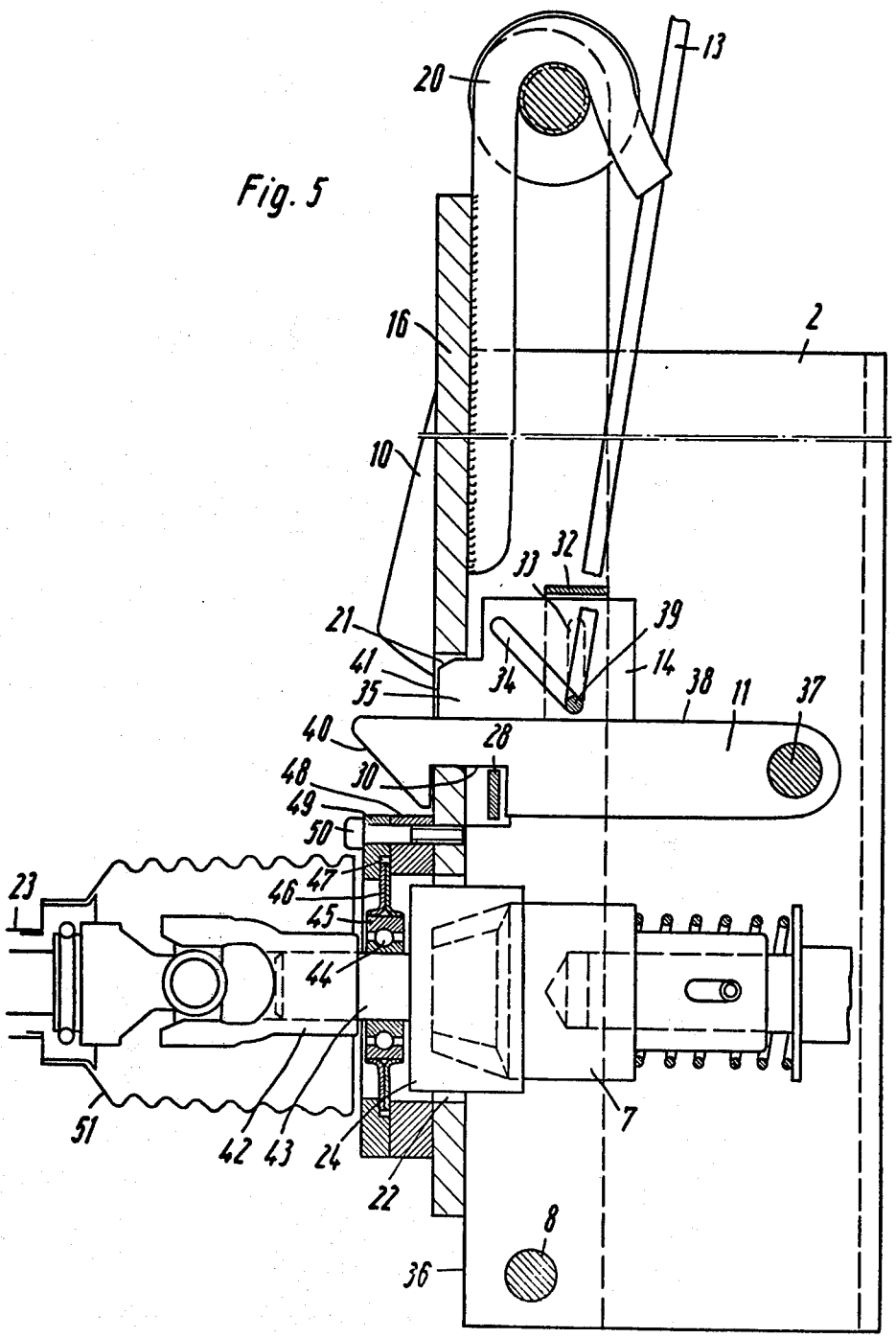
FIG. 5 is a longitudinal sectional view through the connection device of the present invention in the connected position.

FIG. 5 shows these coupling members in the coupled position. The coupling plate 16 is in contact with coupling plate abutment face 36 of the perforated fixing bars 2. The locking hook 11 extends through the aperture 21 in the plate 16 and its hook jaw reaches behind the plate 16. The strut 28 is likewise in the region of the hook jaw 30. The locking hook 11 is mounted on an axis 37 of the fixing bars 2. The locking hook 11 is provided with a guide lug 32 accommodating a locking slide element 14 which is guided on the top edge 38 of the hook 11. The lug 32 is provided with vertical slots 33, and the slide element 14 comprises an inclined slot 34 which ascends in the direction towards the free end of the locking hook 11. A pin or bolt 39 actuating bracket 13 passes through the slots 33 and 34 of guide lug 32 and locking slide 14 respectively. When the actuating bracket 13 is raised, the bolt 39 will be displaced upwardly within the slot 33 and the locking slide element 14 which carries an extension 35 extending into the clearance of the perforation 21 when in locking position, will be moved along the top edge 38 of the hook 11 in a direction away form the coupling plate 16 because of the functional cooperation of the bolt 39 with the guide slot 34 subsequently, the locking hook 11 may be pivoted upwardly about its axis 37 and out of operative position. When moving into the operative or locking position an inclined face 40 or the locking hook 11 engages the front face of the coupling plate 16. The hook 11 is lifted and the frontal edge 41 of the extension 35 of the locking slide element 14 engages with the front side of the coupling plate so that the locking slide element 14 is first pushed rearwardly. However, as soon as the locking hook 11 has dropped into operative engagement behind the plate 16, the slide element 14 is gravitationally displaced into locking position by the weight of the actuating bracket 13.

The catch bar and locking hooks are jointly associated with either the tractor vehicle, or the working machine or trailer.

The locking slides ensure that the locking hooks do not become disengaged or loosened, e.g., if the joint or coupling between the coupling plate and the locking hooks is subjected to shocks or vibrations.

The articulated transmission shaft 23 whereby drive is transmitted to the working machine 15 is mounted in a bearing on the coupling plate 16. A universal joint fork 42 is connected with a joint or coupling member 24. This member 24 projects through an opening 22 in the plate 16 and has its shank portion 43 supported in a ball bearing 33. The outer bearing element 45 of the ball bearing is retained in a two-part ring 46. The ring 46 is radially movably mounted in an annular groove 47 in a bearing member 48, 49. The groove base diameter of the annular groove 47 is greater than the external diameter of the ring 46. The bearing member is of two-part conformation comprising a first bearing element 48 having a smooth (polished) surface, and a second bearing element 49 formed with an annular recess. The two elements are secured together by screws 50 onto the coupling plate 16. The two bearing elements 48, 49 are arranged relative to one another in such a way that the recess in the element 49 provides the annular groove 47. Because of this form of bearing for the transmission shaft 23 the joint member 24 is capable of radial alignment relative to the cooperating joint member 7 associated with the driving shaft. The joint member 7 is axially resiliently mounted on the driving shaft. The transmission shaft 23 and the joint fork 42 are protected by means of a flexible pleated boot 51.

Figure 6:
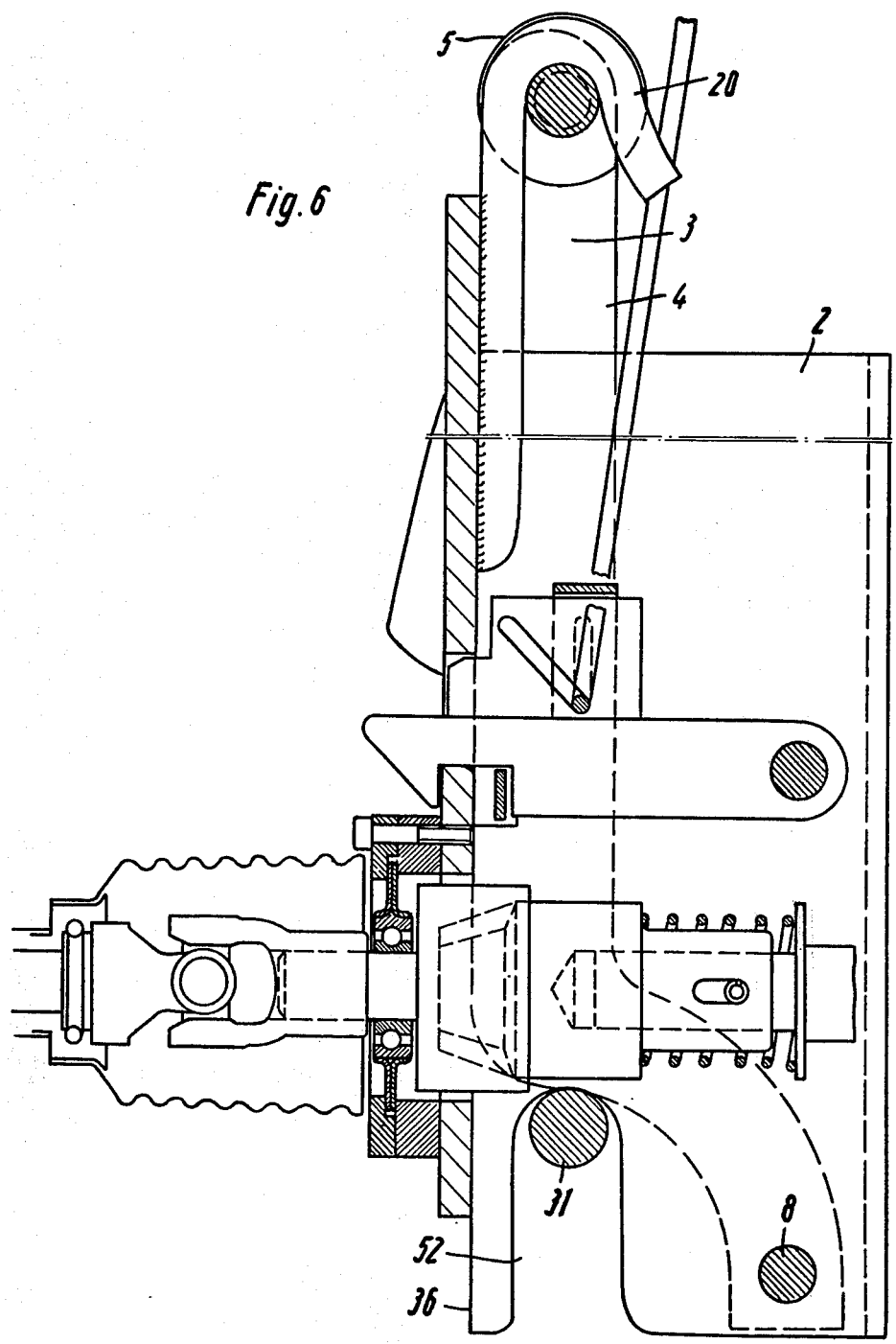
FIG. 6 is a sectional view similar to that of FIG. 5 but showing a modified catch bar.

FIG. 6 is a sectional view which is comparable to that of FIG. 5. The difference resides in that the catch bar 3, or rather its links 4, are of curved, i.e., bent or angled configuration in their lower portions. The pivot mount 8 of the links 4 to the fixation bars 2 is set back as compared with the arrangement of FIG. 5. The perforated fixing bars 2 are provided with guide slots 52 which open towards the bottom and are rounded off. These guide slots 52 receive a cross bar 31 which belongs to a hydraulic ram or lifting device provided on the vehicle or tractor, which acts on the curved portions of the links 4. The guide slots 52 are located between the pivot 8 of the links 4 and the coupling plate abutment face 36. A momentum or force is thus created which acts on the catch bar 3 and at the same time a force is produced which acts axially on the coupling plate 16, transmitted thereto by the alignment roller 5 and the hook 20. This force may be used for drawing up the working machine to be operatively connected and coupled with the vehicle or tractor. The length of the guide slots 52 is that the catch bar 3 will be moved into a position wherein the edge of its links 4 facing the plate 16 will be approximately flush with the plate abutment face 36 of the perforated fixing bars 2. The hydraulic lifting device of which the cross piece 31 is a component may be used, after the coupling operation has been completed and the cross piece 31 has been sufficiently lowered to have moved out of the guide slots 52, for example, for lifting and lowering the attached working machine. However, it is also possible to use the hydraulic lifting device for locking the catch bar 3 in inoperative position when no working machine or trailer is attached.

Figure 7:
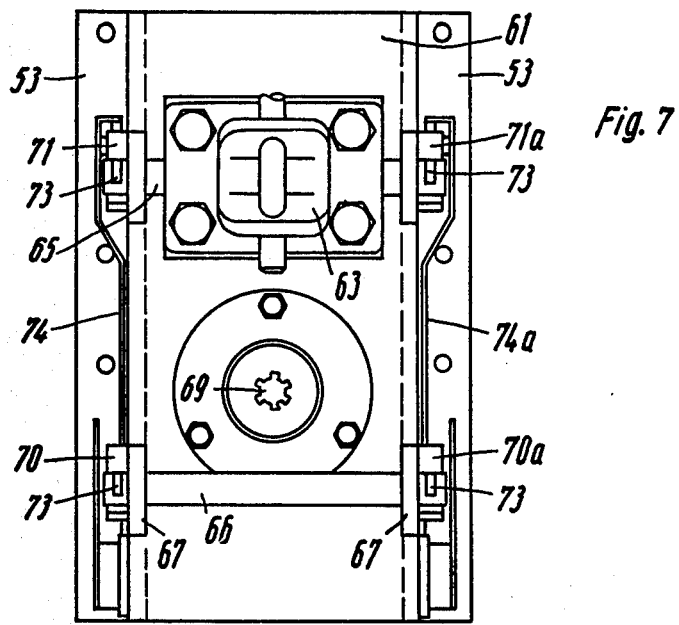
FIG. 7 is a front elevational view of a modification of the coupling plate according to the present invention.
Figure 8:
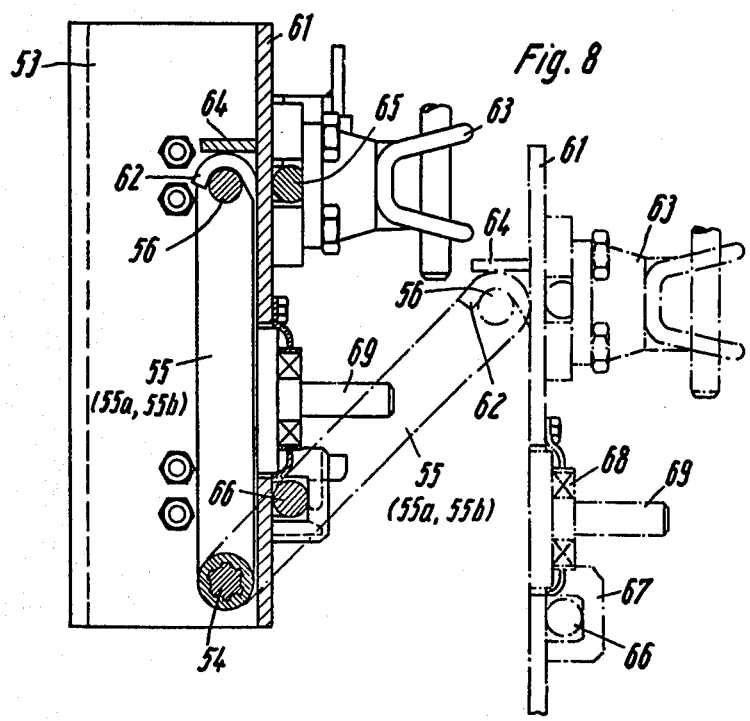
FIG. 8 is a sectional view of the coupling plate of FIG. 7 with the dot-and-dash line showing the coupling plate and catch bar in the initial or receiving position and the solid lines showing the components in the locked position.
Figure 9:
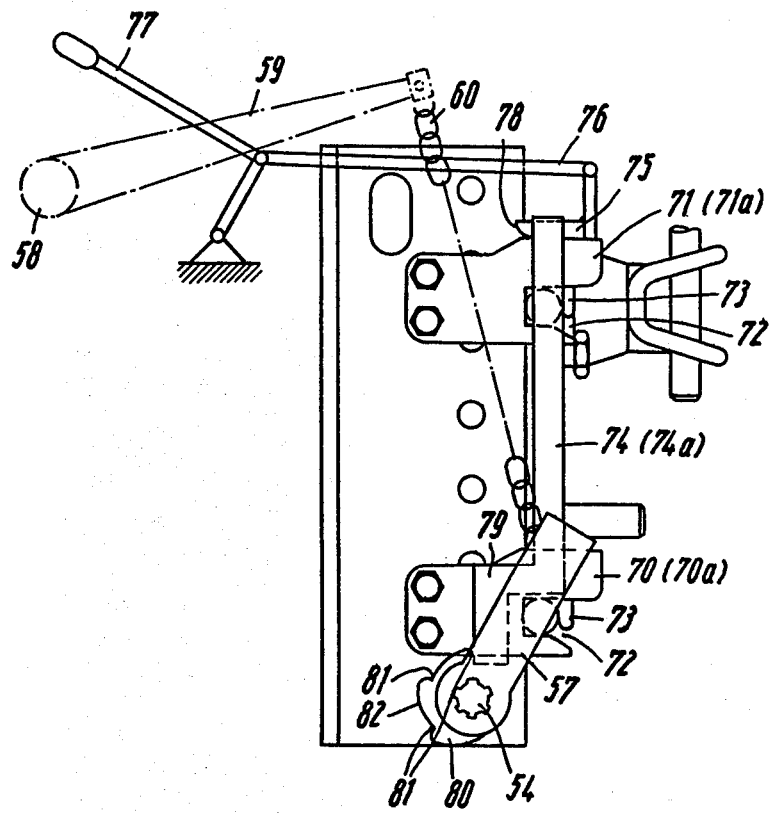
FIG. 9 is a side elevation view of the coupling plate of FIG. 7.

The coupling device according to FIGS. 7 to 9 comprises relatively spaced apart parallel receiving or supporting bars 53 attached e.g., at the rear of a tractor (not shown). The pivot axis 54 of catch bar 55 is mounted on these receiving bars 53. The catch bar 55 itself preferably consists of two links 55a, 55b mounted non-rotationally in mutually parallel, spaced apart relation on the axis 54 between the receiving bars 53. At its upper end the catch bar 55 carries an alignment roller 56 which interconnects the links 55a and 55b and has a smaller diameter in the middle of the roller than at its ends. Preferably, the diameter increases from the middle of the roller in conical or taper conformation towards the outer ends. The axis 59 further has non-rotationally secured thereon a lever 57 which is connected by means of a chain 60 to a power lifting device 59 associated with a tractor (not illustrated) and driven for pivotal movement about axis 58. If this lifting device is operated in the direction of lifting, the catch bar 55 will be moved from catch position into locking position, (i.e., from the position shown in dot-and-dash lines in FIG. 8 into the position shown in solid lines).

The alignment roller 56 of the catch arm 55 co-acts with a coupling plate 61 which comprises a catch hook 62 with a hook jaw adapted to receive the roller 56. On the face remote from this hook 62 the plate carries a traction jaw 63 whereby the coupling plate is engaged in the eye or loop of the traction bar or hitch pole of a drawn working machine, trailer or the like (not shown). In other words, the coupling plate 61 is associated with a working machine, trailer or the like and provided with appropriate means for connection thereto (in the present example with a traction jaw 63). The plate 61 has also connected thereto an alignment bar 64 which effects lateral alignment of the shield plate 61 when this is moved in a direction towards the receiving bars 53.

The lever 57 and the lifting device causes the working machine or trailer to be lifted or raised off the ground and to be approached to the coupling plate abutment faces. This is of special advantage in the case of trailers which have little rolling resistance and tend to yield as the catch arm or bar approaches the coupling plate. It is also very advantageous for machines which are heavy and can hardly be manually raised into the correct coupling position.

One or two substantially horizontally extending stop bolts 65 are fixedly mounted in the upper region of the plate 61 so as to project laterally beyond the same and to be parallel to the surface of plate 61 when it is connected. In the lower region of the shield plate 61 there is provided a further stop bolt 66 projecting on both sides beyond the plate 61 but mounted for sliding movement in a direction transversely of its longitudinal axis. The bolt 66 is guided by two brackets 67 fixed in parallel and spaced with respect to one another. The stop bolts in the upper region of the coupling plate assure central alignment of the plate while the stop bolt in the lower region adapts correspondingly and assures perfectly secure fixation in the retaining means. The bolts provide axial coupling and take up the traction forces.

The coupling plate 61 further carries a bearing 68 or mounting, wherein a power-take-off shaft stub 69 with a quick detachable joint member is mounted for the fitting thereto of an articulated drive transmission shaft and connection with the power-take-off or driving shaft of the tractor.

The receiving bars 53 are associated with holder means 70, 70a, 71, 71a, secured laterally on the outside thereof and each having a jaw-like opening 72 to receive the stop bolts 65 and 66. The jaw-openings 72 are locked by the locking elements 73 associated with the holder means 70, 70a, 71, 71a and thereby the coupling plate 61, which in locked position engages along the links 55a, 55b of the catch bar 66 and the axis 54 in lateral and central alignment between the receiving bars 53, is immobilized and securely fixed so that a connection or coupling joint has been established between the tractor and the working machine or trailer.

The locking elements 73 associated with the holder means 70, 71, or 70a, 71a, belonging to one of the receiving bars 53 are mounted on a linkage 74, 74a. The linkage 74, 74a, and thereby the locking elements 73, are actuated by hand lever 77 via a lever cam drive 73, 76. This lever 77 allows, the uncoupling operation, to be started without the attendant or driver leaving his seat. On actuation of the hand lever 77 in anti-clockwise direction the lever 76 is pulled and the linkage 74, 74a is raised over a cam 75 comprising a curving portion 78. The locking elements 73 are thus moved out of the operative range of the jaw-like openings 72 in the holder means 70, 70a, 71, 71a.

The linkage 74, 74a has in its lower region an extension 79 which cooperates with a cam plate 80 fitted non-rotationally on the axis 54 of the catch bar 55. The cam plate 80 comprises a plurality of engagement positions 81 whereby the catch bar 55 may be maintained in correspondingly differently inclined positions. The region 82 of the cam plate between each pair of successive engagement positions 81 is such that the linkage 74, 74a will maintain the locking elements 73 in open position. Furthermore, one of the rest positions (the position shown in FIG. 9) is designed so that the locking elements 73 may drop into operative engagement to lock the jaw-like opening 72. This construction insures that the locking elements 73 will remain open during the movement of the catch bar 55 from the catch position 9e.g., the position shown in dot-and-dash lines in FIG. 8) into the locking position (shown in solid lines in FIG. 8) and may drop into operative locking engagement only when the catch bar is in the correct corresponding locking position.

The cam plate 81 in combination with the hand lever 77 attached to the actuating rod linkage 74, 74a the catch bar may be moved into differently inclined positions from the drivers seat. The different inclinations depend on the nature of the working machine to be attached, e.g., a trailer or a machine to be suspended at top or bottom.

DESCRIPTION OF OPERATION

The hand lever 77 is operated in counter-clockwise direction whereby the catch bar 55 drops into the position shown in dot-and-dash lines in FIG. 8. For the catch-process the catch arm 55 may occupy differently inclined positions corresponding to the different engagement positions 81 provided on the cam plate 80, and depending on the height of the coupling plate 61 to be lined up. By reversing or backing up the tractor, not here shown, i.e., by advancing the alignment roller 56 towards the catch hook 62, and after the roller has abutted against the surface of the plate 61, the catch arm 55 will slide upwardly until the roller 56 engages in the opening of the hook 62. Owing to the twin-conical construction of the alignment roller 56 the plate 61 will be displaced laterally and with it the catch hook 62 towards the point of smallest diameter of the roller 56. For this purpose, that is to say for actuating the catch bar 55, it is preferred to make use of the power drive 59 of the tractor. This driving device 59 pivots the catch bar 55 upwardly with the aid of the intervening chain and lever elements 57. The working machine or trailer to be coupled to the tractor is moved in the direction towards the receiving bars 53. On approaching the said receiving bars 53, the coupling plate 61 is lined up in the lateral direction with the aid of the alignment bar 64. During this movement the locking elements 73 are in open position, that is to say the jaw openings 72 of the holder means 70, 70a and 71a, are free so that the stop bolts 65 and 66 may be inserted therein. By virtue of the slidable mounting of the stop bolt 66 a three-point bearing or engagement system is achieved and all strains in the hitch are avoided.

After the stop bolt 65 on each side has been inserted into the holders 71 and 71a, the stop bolt 66 will align itself correspondingly and when the catch bar 55 is in approximately vertical position the cam plate 80 permits the linkage 74, 74a to descend. The locking elements 73 drop into engagement to assure secure immobilization of the stop bolts 65 and 66. The stop bolts 65, 66 will take up the traction forces.

Uncoupling or disconnection is performed in the reverse order of succession of individual operations after the hand lever 77 has been actuated, as described above.

Figure 10:
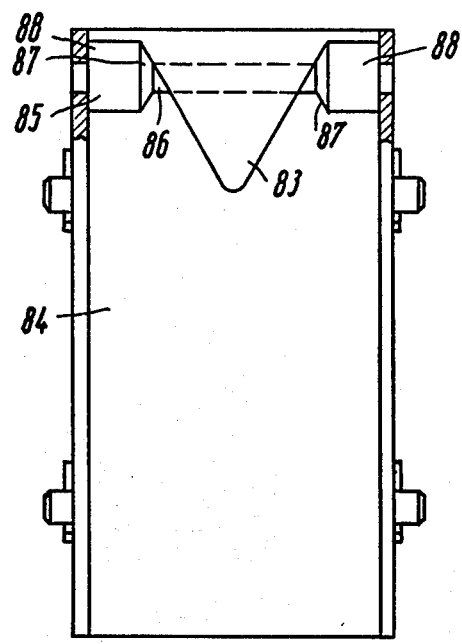
FIG. 10 is a front elevational view of a further modification of the coupling plate.
Figure 11:
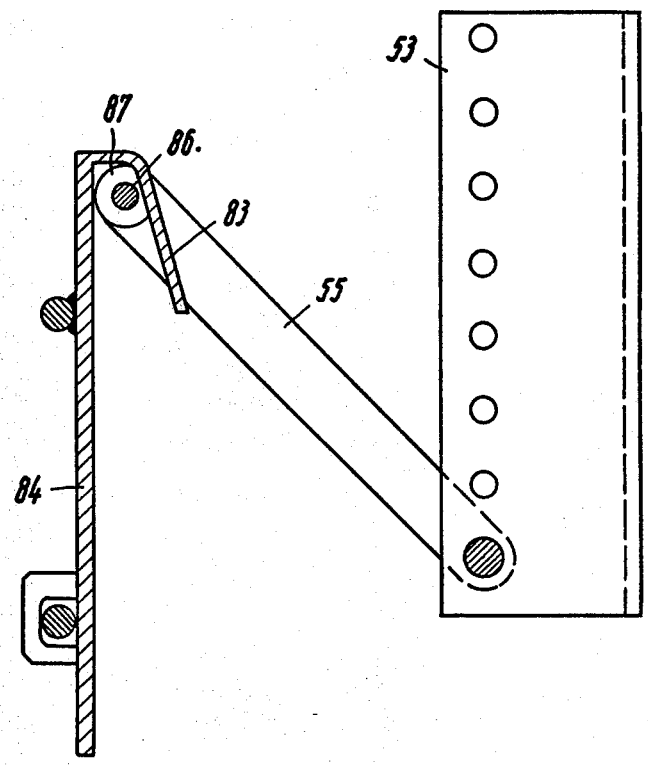
FIG. 11 is a side elevational view of the catch bar and coupling plate of FIG. 10 with the coupling plate being shown in section.

FIGS. 10 and 11 illustrate a modified design for the catch hook 83. In contrast with the catch hook 62 shown in FIGS. 7 to 9, which is of round conformation, the catch hook shown in FIG. 10 is triangular. This configuration assures a particularly efficient engagement and guidance of coupling plate 84. Alignment roller 85 if of correspondingly different design. It comprises a central portion 86 which is cylindrical and of smaller diameter, and adjacent thereto on both sides conically expanding transition portions 87. Next to the largest diameter of these conical transition portions 87 there are provided further cylindrical portions 88 of larger diameter whereby the roller rests on the coupling plate surface. The co-action of the conical regions 87 with the edges of the triangular hook 83 assures a particularly effective centra mutual alignment of the components.

For machines which require a so-called bottom suspension and heavy traction forces, the lower edge of the coupling plate may be provided with an angle plate extending substantially at right angles relative to the surface of the coupling plate and carrying a traction jaw or a traction hook. The plate is secured axially relative to the vehicle, tractor or the like in the region of such angle plate by means of a locking element which is connected with the linkage system.

If the device according to this invention is applied, particularly to heavy vehicles and machinery, such as involved, for example in road construction, a plurality of catch bars may be appropriately mounted on the vehicle while the machine to be attached thereto would be equipped with a corresponding number of catch hooks. The device is also applicable to frontal or rear-attachment operations and may also be used for the mutual or successive coupling of working machines or the like.

It is therefore apparent that time economy and elimination of adaptation times and labor, i.e., for adapting the tractor to the specific machine to be used therewith, are achieved by this invention. Auxiliary labor may be dispensed with for the coupling and uncoupling operations. In the event where the guide bars are associated directly with the coupling plate there is the further advantage that the most favorable kinematics may be selected for any specific machine attached to the tractor. A further advantage is that there is no longer any necessity e.g., for the driver of the tractor, to leave his driver's cab which obstructs his vision in the coupling operation because the catch bar, in coupling condition, is situated fully within the range of vision of the driver and this facilitates accurate approach of the tractor to the coupling plate to be attached thereto. This is important because practical experience has shown that most accidents happen in particular during the driver's ascent and descent to and from a tractor.

The facility of using the device of this invention in combination or conjunction with conventional and widely adopted attachment methods affords the important economic advantage to the user that he is not compelled to change his entire stock of equipment and machinery.

It will be understood that this invention is susceptible to modification in order to adapt it to different usages and conditions, and accordingly, it is desired to comprehend such modifications within this invention as may fall within the scope of the appended claims.

What is claimed is;

1. In a device for connecting a power transmission shaft on an agricultural implement and the like to a power take-off shaft of a tractor vehicle, the combination of a catch bar pivotally mounted on the rear of a tractor vehicle, an inwardly tapered alignment roller on said catch bar, a coupling plate mounted on the implement to be connected, an aligning hook on said coupling plate having an opening engageable with said catch bar inwardly tapered alignment roller and shaped to align vertically and horizontally the plate and transmission shaft with the power take-off shaft, and mutually engageable means on said tractor power take-off shaft and said power transmission shaft for coupling said shafts in the vicinity of said coupling plate.

2. In a device as claimed in claim 1 and a stub shaft mounted on said coupling plate and having releasable means thereon for coupling with a power take-off shaft on said tractor, said stub shaft having means thereon for coupling with a power transmission shaft on the implement.

3. In a device as claimed in claim 1 wherein said coupling plate has an opening therein adapted to receive a coupling member of a power transmission shaft on the implement connectable with a power take-off shaft of a tractor.

4. In a device as claimed in claim 3 and bearing means on said coupling plate adapted to journal one of said power transmission shaft of the implement or said tractor power take-off shaft.

5. In a device as claimed in claim 4 wherein said transmission shaft or said power take-off shaft is slidably mounted within said bearing means.

6. In a device as claimed in claim 4 and bearing mount means on said coupling plate and having an inner annular groove therein, a ring supported within said groove, said bearing means being mounted within said ring and comprising one of anti-friction or slide elements.

* * * * *